United States Patent
Baek et al.

(10) Patent No.: US 7,140,296 B2
(45) Date of Patent: Nov. 28, 2006

(54) METHOD FOR FORMING PATTERN OF LIQUID CRYSTAL DISPLAY DEVICE

(75) Inventors: Myoung-Kee Baek, Gyeonggi-Do (KR); Kwon-Shik Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 9 days.

(21) Appl. No.: 10/718,561

(22) Filed: Nov. 24, 2003

(65) Prior Publication Data

US 2004/0125330 A1    Jul. 1, 2004

(30) Foreign Application Priority Data

Dec. 27, 2002    (KR) ............... 10-2002-0085636

(51) Int. Cl.
*B41M 1/10* (2006.01)
*B41F 17/14* (2006.01)
*G02F 1/13* (2006.01)

(52) U.S. Cl. .............. 101/170; 101/492; 101/150; 101/153; 349/187

(58) Field of Classification Search ........... 101/150, 101/151, 153, 155, 157, 163, 167, 169, 170, 101/492; 349/187; 438/689, 694, 778, 779, 438/780, 725
See application file for complete search history.

(56) References Cited

U.S. PATENT DOCUMENTS

| | | | | |
|---|---|---|---|---|
| 2,040,247 A * | 5/1936 | Dultgen | ............... | 430/307 |
| 4,019,436 A * | 4/1977 | Handweiler et al. | ..... | 101/463.1 |
| 4,023,971 A * | 5/1977 | Vested | ............... | 430/5 |
| 4,294,650 A | 10/1981 | Werthmann | ............... | 156/660 |
| 5,201,268 A * | 4/1993 | Yamamoto et al. | ........ | 101/170 |
| 5,259,926 A | 11/1993 | Kuwabara et al. | ........ | 156/659.1 |
| 5,514,503 A | 5/1996 | Evans et al. | ............... | 430/7 |
| 5,544,582 A | 8/1996 | Bocko et al. | ............... | 101/211 |
| 5,662,041 A * | 9/1997 | Kleist | ............... | 101/163 |
| 5,678,483 A | 10/1997 | Johnson | ............... | 101/153 |
| 5,701,815 A | 12/1997 | Bocko et al. | ............... | 101/211 |
| 6,001,515 A | 12/1999 | Evans et al. | ............... | 430/7 |
| 6,356,318 B1 | 3/2002 | Kawahata | ............... | 349/38 |
| 6,374,733 B1 * | 4/2002 | Hayama et al. | ............ | 101/170 |
| 6,730,356 B1 * | 5/2004 | Kim et al. | ............... | 427/256 |
| 6,732,643 B1 * | 5/2004 | Kwon et al. | ............... | 101/170 |
| 2002/0109799 A1 * | 8/2002 | Choi et al. | ............... | 349/43 |
| 2003/0081095 A1 * | 5/2003 | Yi et al. | ............... | 347/101 |
| 2003/0084796 A1 * | 5/2003 | Kwon et al. | ............... | 101/41 |
| 2004/0119935 A1 * | 6/2004 | Baek et al. | ............... | 349/187 |

FOREIGN PATENT DOCUMENTS

| | | |
|---|---|---|
| EP | 0 471 628 A1 | 2/1992 |
| JP | 63-205608 | 8/1988 |
| JP | 3-280416 | 11/1991 |
| JP | 4-94115 | 3/1992 |

(Continued)

*Primary Examiner*—Leslie J. Evanisko
(74) *Attorney, Agent, or Firm*—McKenna Long & Aldridge LLP

(57) ABSTRACT

A method for forming a pattern of a liquid crystal display (LCD) device includes providing a cliché having at least a first groove structure having a first width and a second groove structure having a second width equal to at least a multiple of the first width and an interval, filling a resist material into the first and second groove structures of the cliché, and applying the resist material filled into the first and second groove structures of the cliché onto an etching object layer of a substrate.

12 Claims, 6 Drawing Sheets

FOREIGN PATENT DOCUMENTS

| | | |
|---|---|---|
| JP | 4-239684 | 8/1992 |
| JP | 4-249189 | 9/1992 |
| JP | 4-296724 | 10/1992 |
| JP | 5-11270 | 1/1993 |
| JP | 5169614 | 7/1993 |
| JP | 6071853 | 3/1994 |
| JP | 6-202314 | 7/1994 |
| JP | 7-240523 | 9/1995 |
| JP | 8025791 | 1/1996 |
| JP | 8094822 | 4/1996 |

* cited by examiner

METHOD FOR FORMING PATTERN OF LIQUID CRYSTAL DISPLAY DEVICE

The present invention claims the benefit of Korean Patent Application No. 85636/2002 filed in Korea on Dec. 27, 2002, which is hereby incorporated by reference.

BACKGROUND OF THE INVENTION

1. Field of the Invention

The present invention relates to a method for forming a pattern, and more particularly, to a method for forming a pattern of a liquid crystal display device.

2. Description of the Related Art

Cathode ray tube (CRT) monitors have been commonly used for displaying information on television and computer displays. Although the CRT monitors have high image quality and brightness, as sizes of image screens increase, a depth of the CRT monitor increases to occupy very large volumes. In addition, the weight of the CRT monitors has always been problematic in portable devices.

Flat panel display devices, such as liquid crystal displays, plasma display panels, organic electro luminescence displays, light emitting diodes, and field emission displays, have been used to replace the CRT monitors. Among these different flat panel display devices, the liquid crystal display (LCD) devices are commonly used as monitors of notebook and desktop personal computers because of their low power consumption.

FIG. 1 is a cross sectional view of an LCD device according to the related art. In FIG. 1, the LCD device includes a lower substrate 10, an upper substrate 20, and a liquid crystal layer 15 formed in between the upper and lower substrates 10 and 20. A thin film transistor T and a pixel electrode 7 are formed on the lower substrate 10, wherein the thin film transistor T include: a gate electrode 1 to which scan signals are supplied, a semiconductor layer 3 for transmitting data signals corresponding to the scan signals, a gate insulating layer 2 for electrically isolating the semiconductor layer 3 and the gate electrode 1, a source electrode 4 formed on an upper part of the semiconductor layer 3 for supplying the data signals, and a drain electrode 5 for supplying the data signals to the pixel electrode 7. The semiconductor layer 3 comprises an active layer 3a formed of amorphous silicon (a-Si), and an n+ doped ohmic contact layer 3b formed on both upper sides of the active layer 3a. A passivation layer 6 and the pixel electrode 7 are formed on the thin film transistor T, and a first alignment layer 4a formed for aligning liquid crystal molecules is formed on an upper part of the pixel electrode 7. The pixel electrode 7 is formed of a transparent conductor, such as indium tin oxide (ITO) or indium zinc oxide (IZO), so that the light can be transmitted through the pixel electrode 7.

A black matrix 12 is formed on the upper substrate 20 for preventing the light from leaking between adjacent pixels, and color filters 11 of red (R), green (G), and blue (B), for producing colored light, are formed on the black matrix 12. A flattening layer (not shown) can be additionally formed on the color filter 11 for flattening the color filter and for improving an adhesive bond to a common electrode 13 subsequently formed on the color filters 11, wherein the common electrode 13 applies a voltage to the liquid crystal layer 15 and is formed of a transparent conductor, such as ITO or IZO. In addition, a second alignment layer 4b, for aligning the liquid crystal molecules, is formed on the common electrode 13.

During fabrication of the LCD device, several steps of thin film deposition and photolithographic processes should be performed. For example, in order to fabricate the thin film transistor T, the color filters 11, and the black matrix 12, photoresist patterns are formed by application of a photoresist material, exposure and strip processes using a mask from the photoresist patterns, and an etching process using the photoresist patterns as a mask. However, the photoresist forming process involves complex fabrication processes and is not suitable for a large area display device. Thus, a printing method by which patterned photoresist can be formed simply without the exposure process has been developed.

FIGS. 2A to 2C are schematic cross sectional views of a fabrication process according to the related art. In FIG. 2A, a cliché 24 with a concave groove 23 formed at a position corresponding to a pattern desired to be formed on a substrate is prepared. Then, a resist 31 is deposited on a surface of the cliché 24. Next, a doctor blade 32 is placed in contact with the surface of the cliché 24 and flattens the resist 31 across the surface of the cliché 24. Accordingly, the resist 31 fills the groove 23 while the resist remaining on the surface of the cliché 24 is removed.

In FIG. 2B, the resist 31 filled in the groove 23 of the cliché 24 is transferred onto a surface of the printing roll 33 as the print roll 33 rotates across the surface of the cliché 24. The printing roll 33 is formed having the same width as a width of a panel of a display device desired to be fabricated, and has a circumference equal to a length of the panel. Accordingly, the resist 31 filled in the groove 23 of the cliché 24 is transferred onto the printing roll 33.

In FIG. 2C, the resist 31 previously transferred onto the printing roll 33 contacts a surface of the substrate 30 as the printing roll 33 is rotated. Then, the resist 31 is transferred from the printing roll 33 onto the surface of the substrate 30. Next, the applied resist 31 is UV-irradiated or heated to be dried to form a resist pattern.

However, in the LCD devices, pattern sizes differ according to different layers that are to be formed, and differ for the same layers. In addition, although the pattern sizes determine a viscosity of the resist to be used, resists of different viscosities cannot be printed at one time. Thus, a resist having viscosity suitable for a pattern of a corresponding size has to be selected. When using a resist suitable for a relatively small pattern, when the resist is filled into the grooves of the cliche and flattened by the doctor blade, the resist is removed more easily at a center portion of the cliché than at edge portions of the cliché. Accordingly, the thickness of a pattern is not uniform.

FIGS. 3A and 3B are schematic cross sectional views comparing resist patterns according to the related art. In FIG. 3A, a normally printed resist pattern 35a is formed on the substrate 30. In FIG. 3B, an inferior resist pattern 35b is formed on the substrate 30. As shown, the normally printed resist pattern 35a has a uniform thickness, wherein thicknesses of the inferior pattern 35b varies at the ends and middle portions. As a result, the inferior resist pattern 35b causes fabrication of a defected LCD device.

SUMMARY OF THE INVENTION

Accordingly, the present invention is directed to a method for forming a pattern of an LCD device that substantially obviates one or more of the problems due to limitations and disadvantages of the related art.

An object of the present invention is to provide a method for forming a pattern of an LCD device capable of forming a precise pattern.

Additional features and advantages of the invention will be set forth in the description which follows, and in part will be apparent from the description, or may be learned by practice of the invention. The objectives and advantages of the invention will be realized and attained by the structure and processes particularly pointed out in the written description and claims hereof as well as the appended drawings.

To achieve these and other advantages and in accordance with the purpose of the present invention, as embodied and broadly described herein, a method for forming a pattern of a liquid crystal display (LCD) device includes providing a cliché having at least a first groove structure having a first width and a second groove structure having a second width equal to at least a multiple of the first width and an interval, filling a resist material into the first and second groove structures of the cliché, and applying the resist material filled into the first and second groove structures of the cliché onto an etching object layer of a substrate.

In another aspect, a method for forming a pattern of an LCD device includes forming a buffer layer on a substrate by depositing one of an organic material and a metal material, providing a cliché having at least first and second groove structures by patterning the buffer layer, the first groove structure having a first width and a second groove structure having a second width including a multiple of the first width and an interval, depositing a resist material onto a surface of the cliché, flattening the surface of the cliché using a doctor blade to fill the resist material into the first and second groove structures and removing the resist material from the surface of the cliché, transferring the resist material filled in the first and second groove structure of the cliché onto a printing roll, and applying the resist material formed onto the printing roll onto an etching object to form a resist pattern having a uniform thickness.

In another aspect, a method for forming a pattern of an LCD device includes forming a buffer layer on a substrate by depositing one of an organic material and a metal material, providing a cliché having at least a first groove structure having a first width and a second groove structure having a second width equal to a multiple of the first width and an interval, depositing a resist material on a surface of the cliché, flattening the surface of the cliché using a doctor blade to fill the resist material into the first and second groove structures and removing the resist material that remains on the surface of the cliché, attaching a substrate where an etching object layer is formed onto the cliché and applying at least one of heat and pressure, and detaching the substrate from the cliché to transfer the resist material filled in the first and second groove structures of the cliché onto the etching object layer and to form a resist pattern.

It is to be understood that both the foregoing general description and the follow detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A to 4F are schematic cross sectional views of an exemplary method of fabricating an LCD device according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
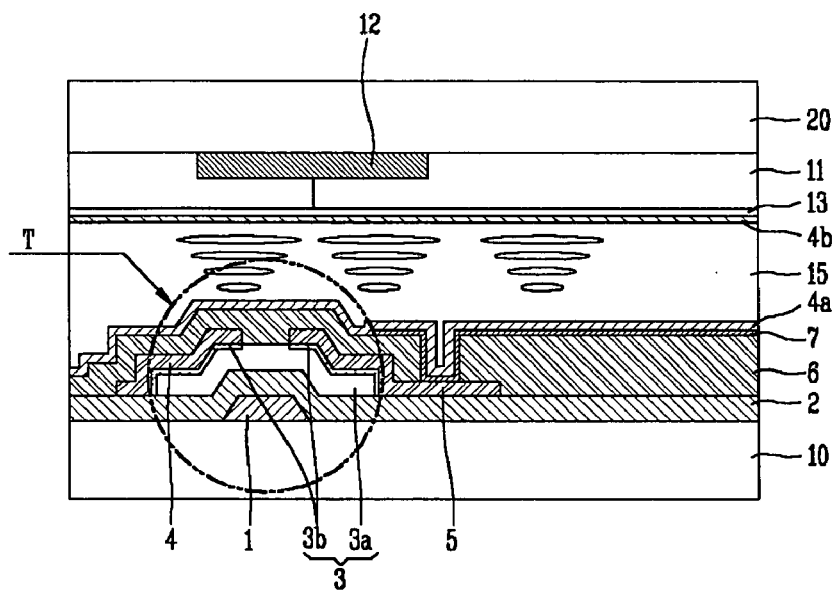
FIG. 1 is a cross sectional view of an LCD device according to the related art.
Figure 2A:
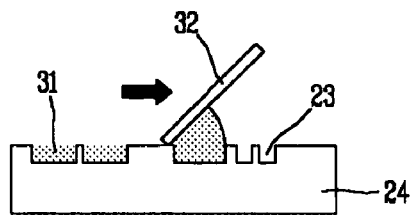
FIGS. 2A to 2C are schematic cross sectional views of a fabrication process according to the related art.
Figure 2B:
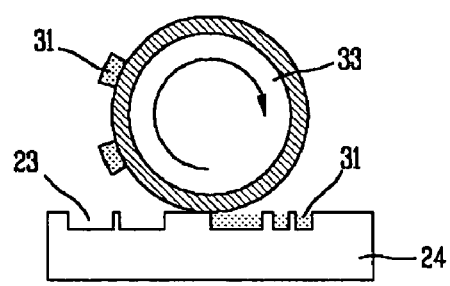
Figure 2C:
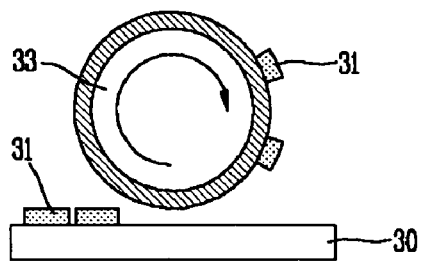
Figure 3A:
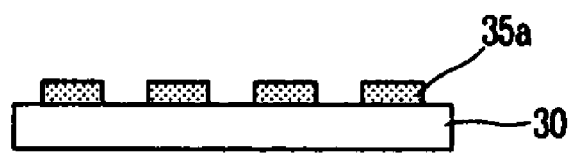
FIGS. 3A and 3B are schematic cross sectional views comparing resist patterns according to the related art.
Figure 3B:
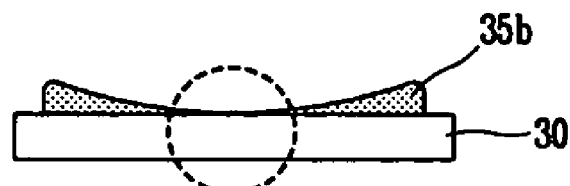
Figure 4A:
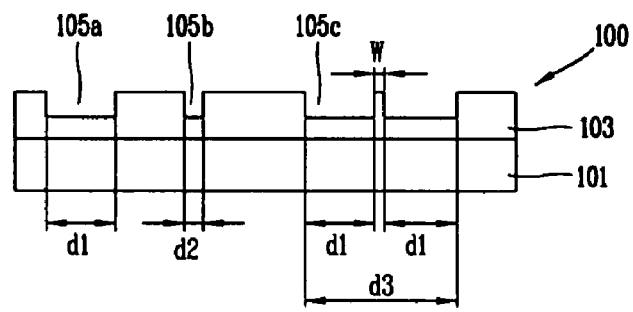

FIGS. 4A to 4E are schematic cross sectional views of an exemplary method of fabricating an LCD device according to the present invention. In FIG. 4A, a substrate 101 may be prepared, and then a buffer layer 103, such as a metal, an organic film, or silicon, may be deposited onto the substrate 101. Then, the buffer layer 103 may be patterned using photolithographic processes to fabricate a cliché 100 having a plurality of grooves 105a, 105b, and 105c. The grooves 105a, 105b, and 105c are mask patterns used for forming a pattern of the LCD device. Since the pattern of the LCD device may be used for the same layer having various sizes, sizes of the grooves 105a, 105b, and 105c may have different dimensions and related intervals. For example, the first groove 105a may have a first width d1, the second groove 105b may have a width d2 narrower than the width d1 of the first groove 105a, and the third groove 105c may have a width d3 wider than the width d1 of the first groove.

The first groove 105a may be formed to provide a first resist pattern having a uniform thickness. The third groove 105c may be formed to include at least two grooves similar to the first groove 105a, wherein an interval W is provided between the two grooves. Accordingly, the third groove 105c may be formed to provide a relatively longer second resist pattern than the first resist pattern having a uniform thickness. The interval W may be determined by the viscosity and surface energy of the resist material. For example, when using a resist material having a high viscosity and surface energy, the interval W may be narrow enough to generate interference between adjacent resist patterns. Likewise, when using a resist material having a low viscosity and surface energy, the interval W may be wider.

Figure 4B:
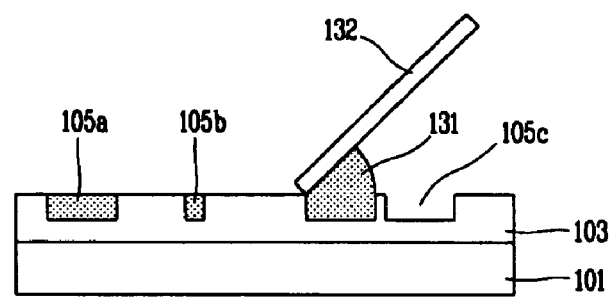

In FIG. 4B, a resist material 131 may be deposited onto a surface of the cliché 100, and then flattened by using a doctor blade 132. Accordingly, the resist material 131 is filled only into the grooves 105a, 105b, and 105c and the resist material 131 that remains on the surface of the cliche 100 may be removed.

Figure 4C:
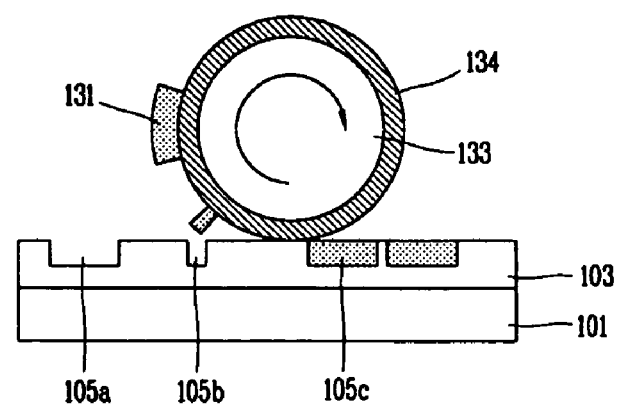

In FIG. 4C, the resist material 131 filled into the grooves 105a, 105b, and 105c of the cliché 100 may be transferred onto a surface of a printing roll 133. The printing roll 133 may be formed to have the same width as a substrate to be fabricated, and may have a circumference the same as a a length of the substrate. Accordingly, the resist material 131 filled into the grooves 105a, 105b, and 105c of the cliché 100 may be transferred onto the circumference surface of the printing roll 133 by a single rotation. At this time, a blanket 134 may be deposited onto the surface of the printing roll 133 for improving adhesive force to the resist 131

The buffer layer 103 may facilitate detachment of the resist 131 from the grooves 105a, 105b, and 105c of the cliché 100 onto the printing roll 133. In addition, the buffer layer 103 may provide protection of the substrate 101 from impact by the printing roll 133. Since the resist material 131 may have a weaker adhesive force with the buffer layer 103 than with the substrate 101, the resist material 131 may be detached from the grooves 105a, 105b, and 105c in the buffer layer 103 more easily. Alternatively, the grooves 105a, 105b, and 105c may be formed by etching the substrate 101 without forming the buffer layer 103 on the substrate 101. However, cracks may be generated at lower portions of the substrate 101 due to the impact of the printing roll 133 onto the substrate 101. Thus, the buffer layer 103 absorbs the impact of the printing roll 133.

In addition, the resist material 131 may be detached from the cliché 100 more easily by making use of changes in the adhesive characteristics of the resist material due to changes in temperature. For example, when using a resist material having an adhesive force that increases as temperature increases, a heater may be mounted in the cliché 100 and a temperature of the printing roll 133 may be higher than the temperature of the cliché 100. Accordingly, the adhesive force of the resist material 131 with the printing roll 133 may increase, so that the resist material 131 can be detached from the grooves 105a, 105b, and 105c of the cliché 100 more easily. When using a resist material having an adhesive force that increases as temperature decreases, a temperature of the printing roll 133 may be set to be lower than the temperate of the cliché 100, thereby facilitating detachment of the resist material 131 from the grooves 105a, 105b, and 105c of the cliché 100.

Figure 4D:
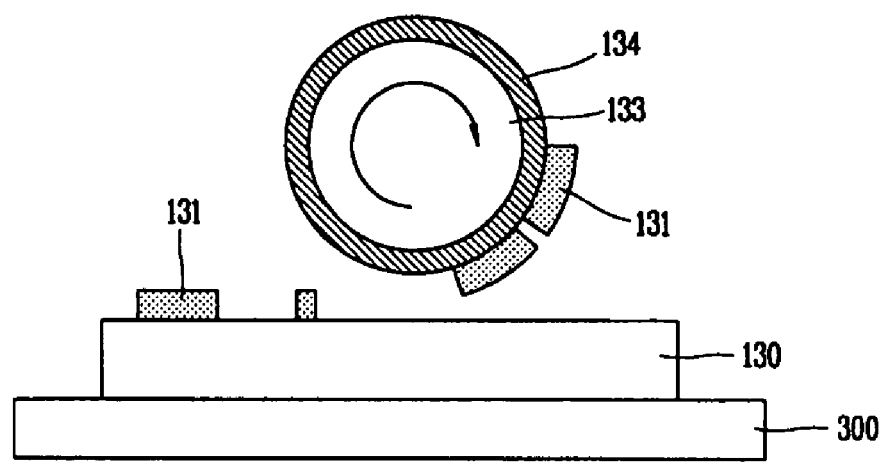

In FIG. 4D, the resist material 131 may be transferred from the printing roll 133 onto a substrate 130 where a pattern will be formed, by rotating the printing roll 133. Accordingly, resist material 131 may be formed on the substrate 130. Here, the substrate 130 where a pattern will be formed may be loaded onto a stage 140, wherein a temperature of the substrate 130 may be controlled by installing a heater in the stage 140. Thus, the resist material 131 may be easily detached from the printing roll 133 onto the substrate 130 more easily. Heaters (not shown) may be installed in the cliché 100, the printing roll 133, and the stage 140 to set temperatures of the cliché 100, the printing roll 133, and the substrate 130 to be uniform and equal.

Figure 4E:
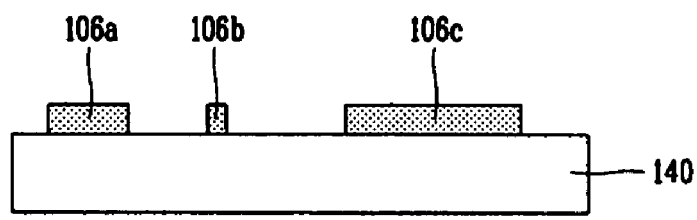

In FIG. 4E, a resist pattern 106 may be formed on the substrate 130 using the resist material 131 (in FIG. 4D). Accordingly, the resist pattern may include first, second, and third resist patterns 106a, 106b, and 106c each having the same thickness regardless of a pattern size. The first resist pattern 106a may be formed by the resist material 131 filled into the first groove 105a (in FIG. 4C), and the second and third resist patterns 106b and 106c may be formed by the resist material 131 filled into the second and third grooves 105b and 105c (in FIG. 4C).

Next, an etching object layer 135 for forming a pattern may be formed on the substrate 130, as shown in FIG. 4F. The etching object layer 135 may be a metal layer for forming a metal pattern, such as a gate electrode, source/drain electrodes, a gate line, a data line, a pixel electrode, and a storage electrode, or may be an insulating layer, such as SiOx or SiNx. The etching object layer may include an organic layer.

The metal layer or the insulating layer may be etched by common etching processes using the resist patterns formed thereon as a mask. Accordingly, a metal layer of a desired pattern (an electrode structure) or an insulating layer (contact hole) may be formed.

Figure 5A:
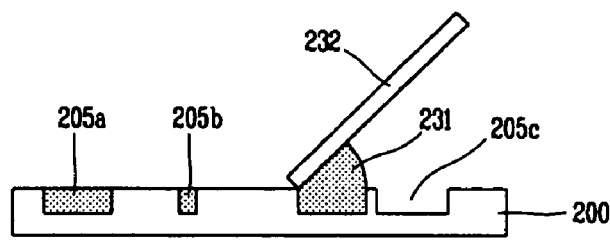
FIGS. 5A to 5D are schematic cross sectional views of another exemplary method of fabricating an LCD device according to the present invention.
Figure 5B:
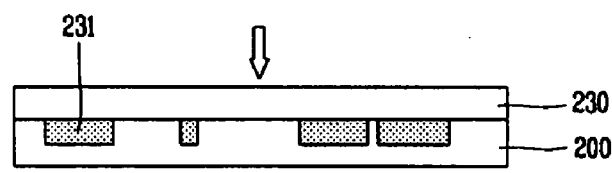
Figure 5C:
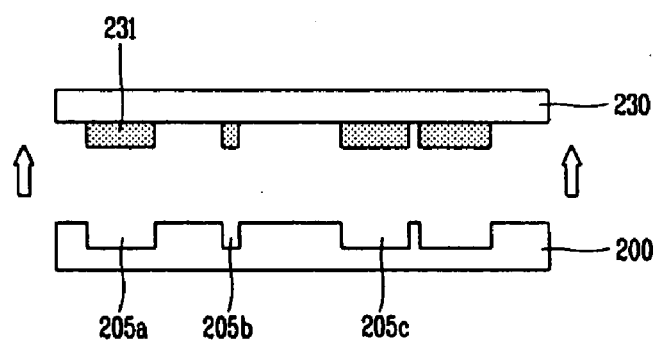

FIGS. 5A to 5C schematic cross sectional views of another exemplary method of fabricating an LCD device according to the present invention. In FIG. 5A, a cliché 200, which may include a plurality of grooves 205a, 205b, and 205c, may be prepared. Then, a resist material 231 may be deposited onto a surface of the cliche 200. Next, the resist material 231 may be flattened by using a doctor blade 232, thereby filling the plurality of grooves 205a, 205b, and 205c with the resist material 231 and removing any of the resist material 231 that remains on the surface of the cliché 200. Although not shown, the cliche 200 may comprise a substrate and a buffer layer.

The third groove 205c may be formed to include at least two of the first grooves 205a and may be separated from each other by an interval W. Accordingly, the third groove 205c later forms a resist pattern of a uniform thickness.

In FIG. 5B, a substrate 230 where a pattern will be formed may be attached to the surface of the cliché 200 having the resist material 231 filled into the grooves 205a, 205b, and 205c. In addition, heat or pressure may be applied thereto.

In FIG. 5C, the substrate 230 may be detached from the cliché 200 in order to transfer the resist material 231 filled into the grooves 205a, 205b, and 205c onto the substrate 230.

Figure 5D:
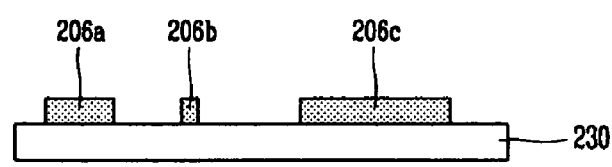

In FIG. 5D, a resist pattern 206a, 206b, and 206c may be formed on the substrate 230, wherein each resist pattern 206a, 206b, and 206c may be formed using the resist material 231 filled into the first, second, and third grooves 205a, 205b, and 205c.

According to the present invention, by forming patterns having different widths for the same layer, mask patterns thereof may be formed by a single printing process. Thus, patterns having relatively large widths may be divided into standard pattern widths thus to form grooves of the cliché, so that patterns having the same thickness can be formed by a single process regardless of a size of the pattern. For example, when a width of the pattern formed on the cliché is large, the large width may be divided into multiple small widths having an interval therebetween. As a result, etching inferiority due to uneven thickness of the resist material may be prevented, thereby increasing production efficiency.

It will apparent to those skilled in the art that various modification and variations can be made in the method for forming pattern of liquid crystal display device of the present invention without departing from the spirit or scope of the invention. Thus, it is intended that the present invention cover the modifications and variations of this invention provided they come within the scope of the appended claims and their equivalents.

What is claimed is:

1. A method for forming a pattern of a liquid crystal display (LCD) device, comprising:
    providing a cliché having at least a first groove structure having a first width and a second groove structure having a second width divided into multiples of the first width and an interval therebetween wherein the interval is determined by viscosity and surface energy of a resist material;
    filling the resist material into the first and second groove structures of the cliché; and
    applying the resist material filled into the first and second groove structures of the cliché onto an etching object layer of a substrate of the liquid crystal display device.

2. The method of claim 1, wherein providing a cliché comprises:
providing a cliché substrate, forming a buffer layer on the cliché substrate, and forming the first and second groove structures by patterning the buffer layer.

3. The method of claim 2, wherein the buffer layer includes a metal layer.

4. The method of claim 2, wherein the buffer layer includes an organic layer.

5. The method of claim 1, wherein applying the resist material onto an etching object layer comprises:
contacting and rotating a printing roll onto the cliché to transfer the resist material filled in the first and second groove structures to a surface of the printing roll; and
contacting the resist material formed on the surface of the printing roll to transfer the resist material from the printing roll onto the etching object layer by rotating the printing roll.

6. The method of claim 1, wherein applying the resist material onto an etching object layer comprises:
contacting the etching object layer formed on the substrate of the liquid crystal display device with the cliché;
applying heat or pressure to the substrate of the liquid crystal display device; and
detaching the substrate of the liquid crystal display device from the cliché to transfer the resist material filled in the first and second groove structures onto the etching object layer.

7. The method of claim 1, wherein the etching object layer includes a metal layer.

8. The method of claim 1, wherein the etching object layer includes one of SiNx and SiOx.

9. The method of claim 1, wherein the etching object layer includes an organic layer.

10. The method of claim 1, wherein filling a resist material into the first and second groove structures of the cliché comprises:
depositing the resist material along an entire surface of the cliché; and
contacting a doctor blade onto the surface of the cliché, flattening the resist material into the first and second groove structures and removing the resist material that remains on the surface of the cliché.

11. A method for forming a pattern of an LCD device, comprising:
forming a buffer layer on a substrate by depositing one of an organic material and a metal material;
providing a cliché having at least first and second groove structures by patterning the buffer layer, the first groove structure having a first width and the second groove structure having a second width divided into multiples of the first width and an interval therebetween, wherein the interval is determined by viscosity and surface enemy of a resist material;
depositing the resist material onto a surface of the cliché;
flattening the resist material into the first and second groove structures and removing the resist material from the surface of the cliché;
transferring the resist material filled in the first and second groove structure of the cliché onto a printing roll; and
applying the resist material formed onto the printing roll onto an etching object layer to form a resist pattern having a uniform thickness.

12. A method for forming a pattern of an LCD device, comprising:
forming a buffer layer on a substrate of a cliché by depositing one of an organic material and a metal material on the cliché substrate;
providing on the cliché substrate at least a first groove structure having a first width and a second groove structure having a second width divided into multiples of the first width and an interval therebetween, wherein the interval is determined by viscosity and surface energy of a resist material;
depositing a resist material on the surface of the cliché;
flattening the resist material into the first and second groove structures and removing the resist material that remains on the surface of the cliché;
forming an etching object layer on a substrate of the LCD device, attaching the substrate of the LCD device, including the etching object layer onto the cliché and applying at least one of heat and pressure; and
detaching the substrate of the LCD device, including the etching object layer, from the cliché to transfer the resist material filled in the first and second groove structures of the cliché onto the etching object layer and to form a resist pattern.

* * * * *